US012449831B2

(12) United States Patent
Nam

(10) Patent No.: US 12,449,831 B2
(45) Date of Patent: Oct. 21, 2025

(54) VOLTAGE REGULATOR AND ELECTRONIC DEVICE INCLUDING SAME

(71) Applicant: SAMSUNG ELECTRONICS CO., LTD., Suwon-si (KR)

(72) Inventor: Hyunseok Nam, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 18/137,698

(22) Filed: Apr. 21, 2023

(65) Prior Publication Data

US 2023/0400870 A1 Dec. 14, 2023

(30) Foreign Application Priority Data

Jun. 8, 2022 (KR) ........................ 10-2022-0069731

(51) Int. Cl.
*G05F 1/575* (2006.01)

(52) U.S. Cl.
CPC .................................... *G05F 1/575* (2013.01)

(58) Field of Classification Search
None
See application file for complete search history.

(56) References Cited

U.S. PATENT DOCUMENTS

| | | | | |
|---|---|---|---|---|
| 7,358,709 | B2 * | 4/2008 | Itoh | G05F 1/56 323/280 |
| 9,110,488 | B2 | 8/2015 | Hunter et al. | |
| 9,122,293 | B2 | 9/2015 | Price et al. | |
| 9,577,613 | B2 | 2/2017 | Yang et al. | |
| 9,946,283 | B1 | 4/2018 | Yung et al. | |
| 10,591,938 | B1 * | 3/2020 | Golara | G05F 1/575 |
| 11,036,248 | B1 | 6/2021 | Podzemny | |
| 2008/0157735 | A1 * | 7/2008 | Liu | G05F 1/575 323/280 |
| 2012/0038332 | A1 | 2/2012 | Lin | |
| 2018/0107232 | A1 * | 4/2018 | Yung | G05F 1/575 |
| 2021/0089068 | A1 | 3/2021 | Manohar et al. | |
| 2022/0350356 | A1 * | 11/2022 | D'Souza | H02M 3/156 |

* cited by examiner

*Primary Examiner* — Nguyen Tran
(74) *Attorney, Agent, or Firm* — Fish & Richardson P.C.

(57) ABSTRACT

A voltage regulator providing an output voltage includes; a compensator receiving a reference voltage and a first feedback voltage corresponding to the output voltage and generating a comparison voltage in response to the reference voltage and the first feedback voltage, a buffer input control circuit receiving the comparison voltage and generating a buffer input voltage in response to the comparison voltage and a second feedback voltage, a buffer circuit receiving the buffer input voltage and generating a gate voltage in response to the buffer input voltage, a pass transistor generating an output voltage at an output voltage node in response to the gate voltage, and a fast voltage compensating circuit generating the second feedback voltage in response to the output voltage.

20 Claims, 14 Drawing Sheets

VOLTAGE REGULATOR AND ELECTRONIC DEVICE INCLUDING SAME

CROSS-REFERENCE TO RELATED APPLICATIONS

This application claims priority under 35 U.S.C. § 119 to Korean Patent Application No. 10-2022-0069731 filed on Jun. 8, 2022 in the Korean Intellectual Property Office, the subject matter of which is hereby incorporated by reference in its entirety.

BACKGROUND

Embodiments of the inventive concept relate generally to voltage regulators and electronic devices including same.

A power management integrated circuit (PMIC) may be used in an electronic device to provide one or more voltages (e.g., a power source voltage applied to an application processor, a memory device or an electronic circuit). In this regard, the PMIC may include one or more voltage regulators, wherein a voltage regulator is a circuit configured to provide a constant level voltage. Voltage regulators may be classified as linear regulators or switching regulators in accordance with a constituent voltage regulation scheme. Switching regulators provide good efficiency but poor noise characteristics, whereas linear regulators provide good noise characteristics but poor efficiency. Given their better noise characteristics linear regulators are often preferred to supply a precise, stable voltage.

The low drop-out (LDO) regulator is one type of linear regulator. A LDO regulator may be used to reliably supply power with an electronic device. For example, one or more LDO regulator(s) may be used within a PMIC of a mobile device, such as a smart phone or tablet personal computer (PC).

Most LDO regulators are generally configured to compensate for change in an output voltage in response to a feedback voltage corresponding to the output voltage. Accordingly, because compensation for change in the output voltage is performed using a single loop approach, substantial changes in the output voltage may not be quickly compensated.

SUMMARY

Embodiments of the inventive concept provide voltage regulators exhibiting improved performance and reliability. For example, certain embodiments of the inventive concept provide voltage regulators capable to quickly compensating for an abrupt change in output voltage through a fast feedback loop, thereby allowing the output voltage to be stably maintained at a prescribed target voltage through a slow feedback loop. Other embodiments of the inventive concept provide electronic devices including such voltage regulators.

In one embodiment, the inventive concept provides a voltage regulator configured to output an output voltage includes a compensator that compares a first feedback voltage corresponding to the output voltage with a reference voltage to output a comparison voltage; a first current bias connected between a first power source voltage and a first node; a first transistor connected between the first node and the comparison voltage to operate in response to a voltage of a second node; a buffer circuit that buffers a voltage of the first node to output a gate voltage; a pass transistor connected between an input voltage and an output node through which the output voltage is output to operate in response to the gate voltage; a second current bias connected between the first power source voltage and the second node; and a second transistor connected between the second node and the output node to operate in response to the voltage of the second node.

In another embodiment, the inventive concept provides a voltage regulator configured to output an output voltage includes a compensator that compares a first feedback voltage corresponding to the output voltage with a reference voltage to output a comparison voltage; a buffer circuit that buffers an buffer input voltage to generate a gate voltage; a pass transistor that outputs an output voltage through an output node in response to the gate voltage; a fast voltage compensating circuit that controls a second feedback voltage based on a change in the output voltage; and a buffer input control circuit that controls the buffer input voltage based on the second feedback voltage and the comparison voltage, wherein the fast voltage compensating circuit operates as a common gate amplifier for the change in the output voltage, and the buffer input control circuit operates as a common source amplifier for the second feedback voltage and as a common gate amplifier for the first feedback voltage.

In still another embodiment the inventive concept provides an electronic device includes a reference voltage generator that generates a reference voltage; a voltage regulator that generates an output voltage corresponding to the reference voltage based on the reference voltage; and a load circuit that operates based on the output voltage, wherein, when the output voltage is different from a target level, the voltage regulator compensates for a difference between the output voltage and the target level through a fast feedback loop and maintains the output voltage at the target level through a slow feedback loop, a first transistor of the voltage regulator operates as a common gate amplifier in the slow feedback loop, and in the fast feedback loop, the first transistor of the voltage regulator operates as a common source amplifier and a second transistor of the voltage regulator operates as a common gate amplifier.

BRIEF DESCRIPTION OF THE DRAWINGS

Advantages, benefits and features, as well as the making and use of the inventive concept will be better understood upon consideration of the following detailed description together with the accompanying drawings, in which.

DETAILED DESCRIPTION

Throughout the written description and drawings like reference numbers and labels are used to denote like or similar elements, components, features and/or method steps.

Figure 1:
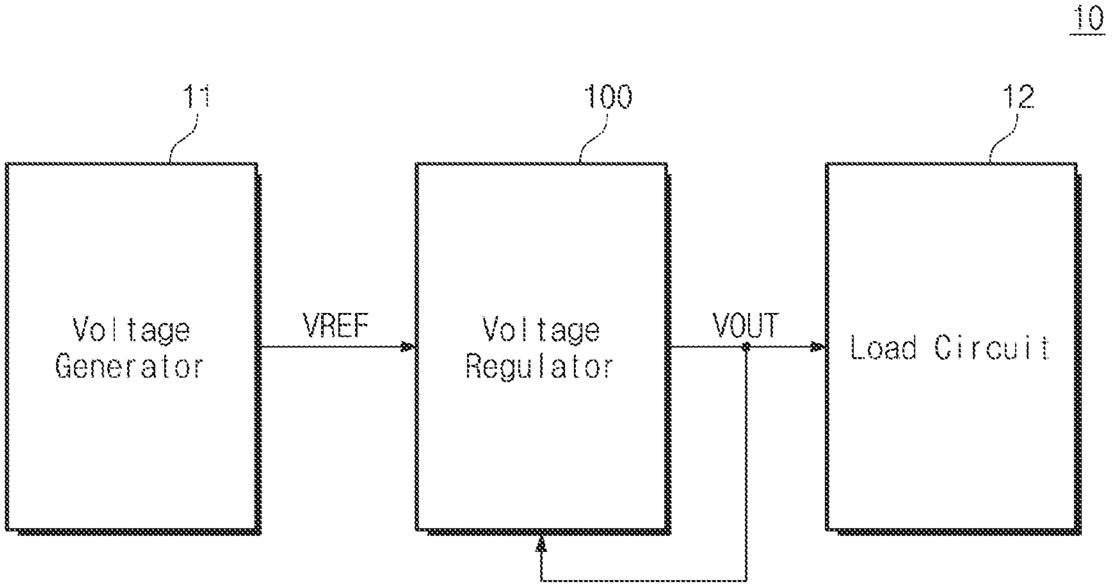
FIG. 1 is a block diagram illustrating an electronic device according to embodiments of the inventive concept.

Figure (FIG. 1 is a block diagram illustrating an electronic device 10 according to embodiments of the inventive concept. Referring to FIG. 1, the electronic device 10 may generally include a voltage generator 11, a voltage regulator 100, and a load circuit 12. Here, the electronic device 10 may be one of, for example, a mobile communication device, a personal digital assistant (PDA), a portable media player (PMP), a digital camera, a smart phone, a tablet PC, a laptop PC, and a wearable electronic device.

The voltage generator 11 may be used to generate a reference voltage VREF in response to one or more externally-applied voltage(s) provided from a power source, such as a battery. In some embodiments, the voltage generator 11 may be a band-gap reference circuit configured to generate the reference voltage VREF.

The voltage regulator 100 may be configured to receive the reference voltage VREF from the voltage generator 11 and generate an output voltage VOUT in response to the reference voltage VREF.

The load circuit 12 may be configured to receive the output voltage VOUT from the voltage regulator 100 as a feedback voltage and stabilize the output voltage VOUT in accordance with a target level in response to the feedback voltage in order to stably provide the output voltage VOUT.

In some embodiments, the voltage regulator 100 may be a low dropout (LDO) regulator. For example, the voltage regulator 100 may be configured to detect change in the output voltage VOUT and then operate in such a manner to effectively compensate for the detected change. Thus, for example, even when a load current associated with the load circuit 12 rapidly changes, the output voltage VOUT may nonetheless remain stably provided.

In some embodiments, the voltage regulator 100 may be configure to include two (2) feedback loops (e.g., a fast feedback loop and a slow feedback loop) respectively configured to compensate for change in the output voltage VOUT. In this regard, the fast feedback loop may be a loop used to compensate for abrupt change in the output voltage VOUT (i.e., change in a high-frequency component), and the slow feedback loop may be a feedback loop used to maintain (or control) stabilization of the output voltage VOUT. Accordingly, the voltage regulator 100 may accurately control the output voltage VOUT while also quickly responding to abrupt change in the output voltage VOUT. Various embodiments and configuration options, as well as possible operating approaches related to voltage regulators according to embodiments of the inventive concept will be described hereafter in some additional detail. However, before presenting such embodiments, configuration options and operating approaches, certain background principles associated with voltage regulators will be reviewed in the context of the example illustrated in FIG. 2.

Figure 2:
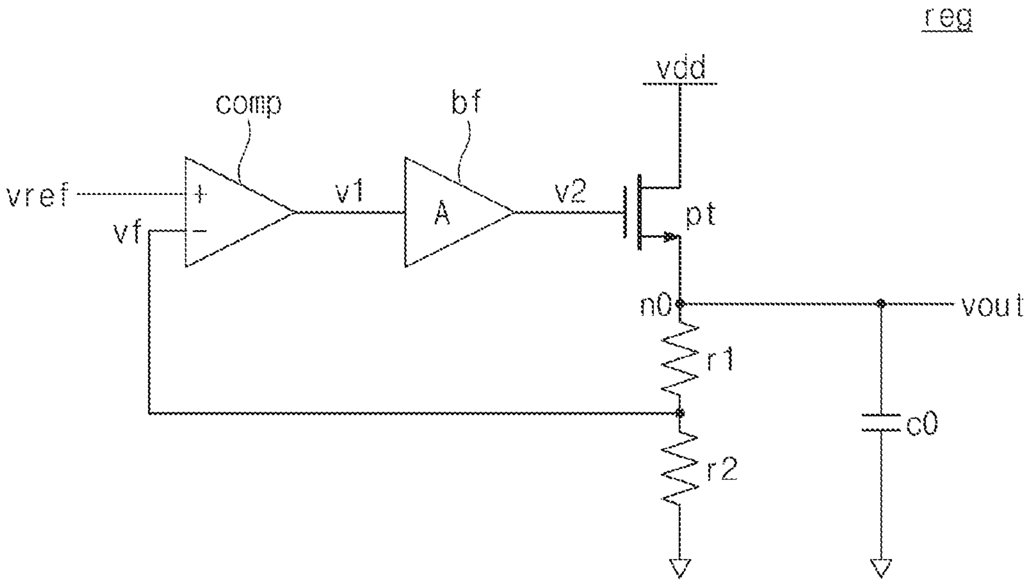
FIG. 2 is a circuit diagram illustrating an exemplary voltage regulator.

FIG. 2 is a circuit diagram illustrating an exemplary voltage regulator (reg). Referring to FIG. 2, the voltage regulator includes a compensator (comp), a buffer circuit (be, a pass transistor (pt), a first resistor (r1) a second resistor (r2), and an output capacitor (c0).

The output capacitor is connected between a zeroth (or $0^{th}$, or voltage output) node n0 through which the output voltage (vout) is provided and a ground node (e.g., a node connected to ground voltage). The first and second resistors may be connected in series between the zeroth node and the ground node. A feedback voltage (vf) obtained by dividing (or sampling) the output voltage may be obtained at a node between the first and second resistors r1 and r2.

The reference voltage (vref) may be applied to a non-inverting input terminal (+) of the compensator, and the feedback voltage may be applied to an inverting input terminal (−) of the compensator comp. As a result, the compensator may output a first voltage (v1) in response to a difference between the reference voltage and the feedback voltage.

The buffer circuit may receive the first voltage as an output of the compensator, and then amplify the first voltage to provide a second voltage (v2). Here, for example, the buffer circuit may be a unit buffer, and the first voltage and the second voltage may have the same level.

The pass transistor may be connected between a power source voltage (e.g., vdd) and the zeroth node, and may be configured to operate in response to the second voltage. Here, for example, the pass transistor may be an N-type metal-oxide-semiconductor field-effect transistor (NMOSFET), but the working example is not limited thereto.

As described above, the voltage regulator may compensate for change in the output voltage by controlling the pass transistor in accordance with change in the output voltage. For example, when a load current associated with a load circuit receiving the output voltage abruptly increases, the level of the output voltage will decrease. Accordingly, the feedback voltage decreases, and the first voltage and the second voltage increase. Due to the increase in the second voltage, a current flowing through the pass transistor increases, such that the output voltage increases to compensate for the change in the output voltage.

Thus, stabilization of the output voltage through the voltage regulator of FIG. 2 is performed through a feedback loop (or negative feedback loop) by the inverting input terminal of the compensator, so that it is impossible to rapidly response to abrupt change in the output voltage. It follows that in order to provide a stable output voltage, the relatively large output capacitor is required. However, provision of a relatively large output capacitor tends to increase manufacturing costs associated with the voltage regulator. In addition, before the feedback loop (or negative feedback loop) operates through the inverting input terminal of the compensator, some portion of change in the output voltage may be partially compensated by so-called "vgs" (i.e., a voltage difference between the gate terminal and the source terminal or a voltage difference between the second voltage and the zeroth node) of the pass transistor. However, because compensation resulting from vgs of the pass transistor varies in accordance with process, voltage, and/or temperature variations (PVT), it is difficult to accurately compensate for the output voltage.

Figure 3:
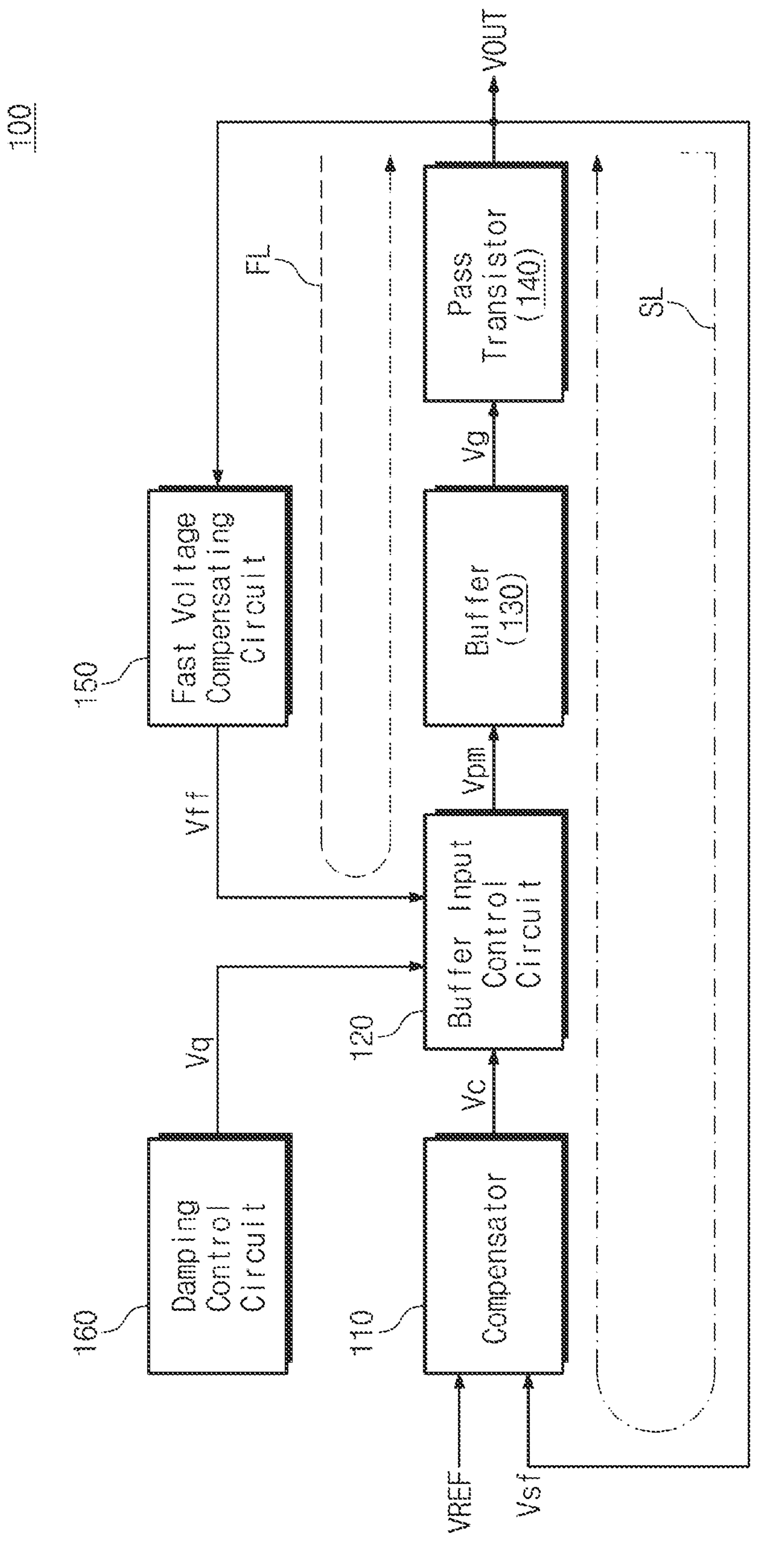
FIG. 3 is a block diagram further illustrating in one example the voltage regulator 100 of FIG. 1.

With the comparative example of FIG. 2 in mind, FIG. 3 is a block diagram further illustrating in one example the voltage regulator 100 of FIG. 1 according to embodiments of the inventive concept. Referring to FIGS. 1 and 3, the voltage regulator 100 may include; a compensator 110, a buffer input control circuit 120, a buffer circuit 130, a pass transistor 140, a fast voltage compensating circuit 150, and a damping control circuit 160. Here, it is assumed that the voltage regulator 100 receives a reference voltage VREF and generates an output voltage VOUT in response to the reference voltage VREF. In some embodiments, the voltage regulator 100 may perform fast compensation for the output voltage VOUT through a fast feedback loop FL. Further, the voltage regulator 100 may precisely control the output voltage VOUT through a slow feedback loop SL.

In this regard, the compensator 110 may receive the reference voltage VREF and a slow feedback voltage Vsf, and output a comparison voltage Vc in response to (or based on) the reference voltage VREF and the slow feedback voltage Vsf. In some embodiments, the slow feedback voltage Vsf may indicate a voltage level directly corresponding to the output voltage VOUT. For example, the slow feedback voltage Vsf may indicate a level of the output voltage VOUT. Alternately, the slow feedback voltage Vsf may indicate a voltage obtained by dividing the output voltage VOUT at a predetermined ratio or a sampled voltage.

The buffer input control circuit 120 may generate a buffer input voltage Vpm in response to the comparison voltage Vc. For example, an increase in the comparison voltage Vc indicates that the slow feedback voltage Vsf has fallen below the reference voltage VREF. In this case the buffer input control circuit 120 may increase the buffer input voltage Vpm. A decrease of the comparison voltage Vc indicates that the slow feedback voltage Vsf has risen above the reference voltage VREF. In this case the buffer input control circuit 120 may decrease the buffer input voltage Vpm.

The buffer circuit 130 may receive the buffer input voltage Vpm generated from the buffer input control circuit 120, amplify (or buffer) the received buffer input voltage Vpm, and generate a gate voltage Vg. In some embodiments, the buffer circuit 130 may be a unit buffer.

The pass transistor 140 may output the output voltage VOUT in response to the gate voltage Vg output from the buffer circuit 130. In some embodiments, the pass transistor 140 may have a source-follower amplifier structure.

The fast voltage compensating circuit 150 may generate a fast feedback voltage Vff in response to change in the output voltage VOUT. In some embodiments, the fast voltage compensating circuit 150 may have a common-gate amplifier structure.

In some embodiments, the buffer input control circuit 120 may be further configured to control the buffer input voltage Vpm in response to the fast feedback voltage Vff generated from the fast voltage compensating circuit 150. That is, through the fast feedback voltage Vff generated from the fast voltage compensating circuit 150, it is possible to rapidly compensate for abrupt change in the output voltage VOUT. Additionally however, with reference to the limitations associated with the comparative example of FIG. 2, the comparison voltage Vc output from the compensator 110 may be generated through the slow feedback loop SL. Accordingly, while it may be impossible to rapidly compensate for abrupt change in the output voltage VOUT using the comparison voltage Vc alone, the fast feedback voltage Vff generated from the fast voltage compensating circuit 150 in accordance with the fast feedback loop FL is able to rapidly compensate for abrupt change in the output voltage VOUT.

Further in this regard, the damping control circuit 160 may provide a stabilization voltage Vq to the buffer input control circuit 120. Accordingly, the buffer input control circuit 120 may be used to control the buffer input voltage Vpm in response to the stabilization voltage Vq. In this case, alternating current (or AC) characteristics of the buffer input voltage Vpm may be improved. For example, peaking of a high frequency band may occur at a node from which the buffer input voltage Vpm is output due to various factors. The damping control circuit 160 may prevent peaking in a high frequency band by providing the stabilization voltage Vq to a node from which the buffer input voltage Vpm is output.

Figure 4:
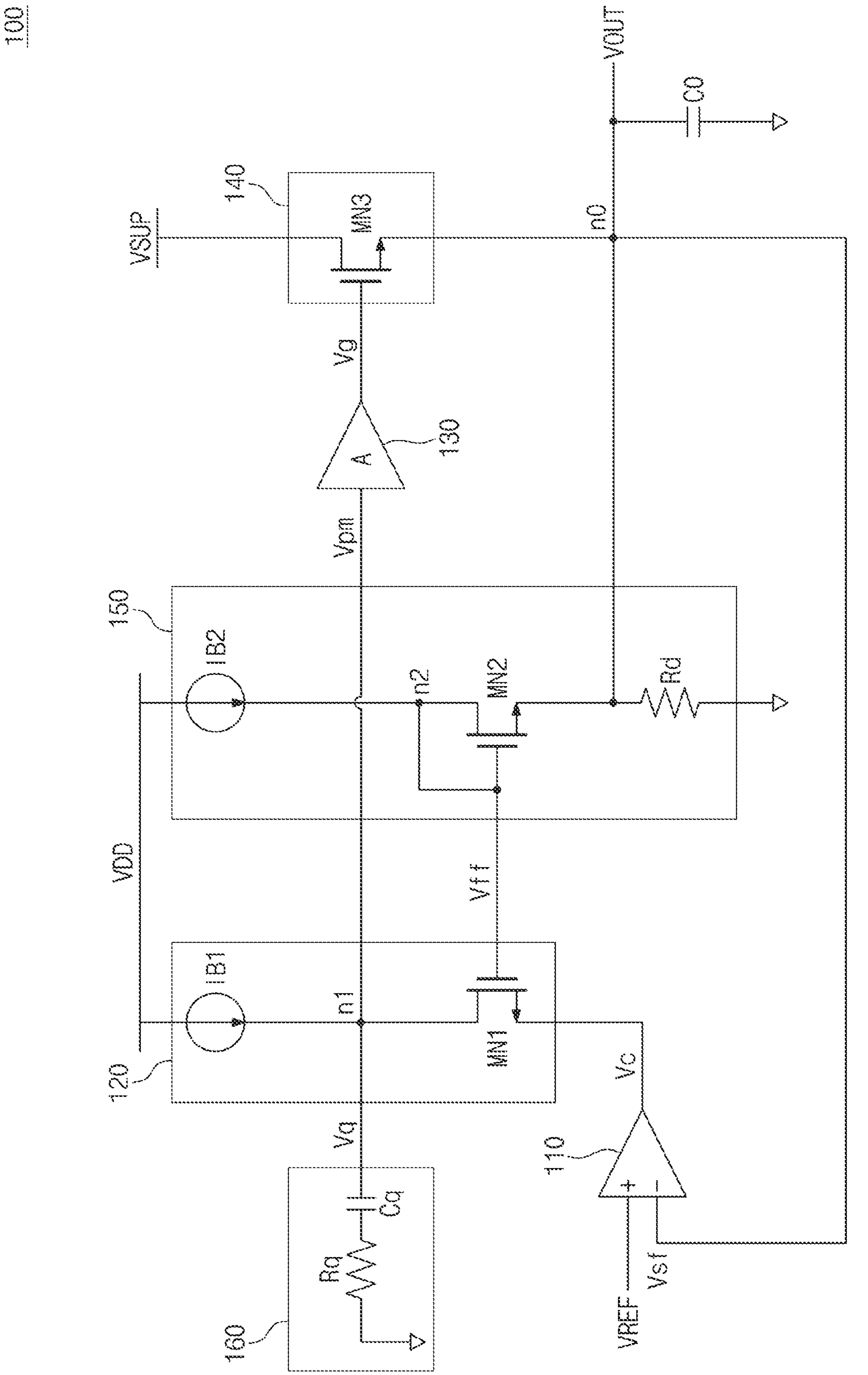
FIG. 4 is a circuit diagram illustrating in one example the voltage regulator of FIG. 3.

FIG. 4 is a circuit diagram further illustrating in one example the voltage regulator of FIG. 3. Hereinafter, for ease of description, first, second and third transistors MN1, MN2 and MN3 are assume to be NMOSFETs, but the scope of the inventive concept is not limited thereto.

Referring to FIGS. 1, 3 and 4, the voltage regulator 100 may generally include the compensator 110, the buffer input control circuit 120, the buffer circuit 130, the pass transistor 140, the fast voltage compensating circuit 150, and the damping control circuit 160.

The compensator 110 may receive the reference voltage VREF through the non-inverting input terminal (+) and the slow (or first) feedback voltage Vsf through the inverting input terminal (−). In some embodiments, the slow feedback voltage Vsf may refer to a voltage apparent at the zeroth node (n0) from which the output voltage VOUT is provided. In some embodiments, the slow feedback voltage Vsf may be a voltage obtained by sampling the voltage apparent at the zeroth node n0 from which the output voltage VOUT is provided. Alternately, the slow feedback voltage Vsf may be a voltage indicative of the voltage apparent at the zeroth node n0, as divided by a specific ratio.

The compensator 110 may compare the reference voltage VREF with the slow feedback voltage Vsf in order to generate the comparison voltage Vc. In some embodiments, the output voltage VOUT may be lower than the target level, and the slow feedback voltage Vsf may be lower than the reference voltage VREF. Accordingly, the comparison voltage Vc may be relatively high. Alternately, the output voltage VOUT may be higher than the target level, and the slow feedback voltage Vsf may be higher than the reference voltage VREF. Accordingly, the comparison voltage Vc may be relatively low.

The fast voltage compensating circuit 150 may include a second current bias IB2, the second transistor MN2, and a resistor Rd. The second current bias IB2 may be connected between the power source voltage VDD and a second node n2. The second transistor MN2 may be connected between the second node n2 and the zeroth node n0 (or output voltage node) and operate in response to a voltage apparent at the second node n2. That is, the second transistor may be diode-connected between the second node n2 and the zeroth node n0 (e.g., output voltage node). For example, the drain terminal of the second transistor MN2 may be connected to the second node n2, the source terminal may be connected to the zeroth node n0, and the gate terminal may be connected to the second node n2. In some embodiments, a fast (or second) feedback voltage Vff may be output through the second node n2. The resistor Rd may be connected between the zeroth node n0 and ground voltage.

The damping control circuit 160 may include a resistor Rq and a capacitor Cq. The resistor Rq and the capacitor Cq may be connected in series between a first (1st) node n1 and ground voltage. In some embodiments, the stabilization voltage Vq may be provided to the first node n1 by the resistor Rq and the capacitor Cq. The stabilization voltage Vq may be used to prevent peaking due to a complex pole in the frequency band of the voltage of the first node n1 (i.e., the buffer input voltage Vpm).

The buffer input control circuit 120 may include a first current bias IB1 and the first transistor MN1. The first current bias IB1 may be connected between the power source voltage VDD and the first node n1. The first transistor MN1 may be connected between the first node n1 and the output terminal (i.e., the comparison voltage Vc) of the compensator 110, and may operate in response to the fast feedback voltage Vff. For example, the drain terminal of the first transistor MN1 may be connected to the first node n1, the source terminal may be connected to the output terminal (i.e., Vc) of the compensator 110, and the gate terminal may be connected to the fast feedback voltage Vff.

In some embodiments, the buffer input voltage Vpm may be controlled or output by the buffer input control circuit 120 through the first node n1. For example, when the comparison voltage Vc or the fast feedback voltage Vff changes, the voltage of the first node n1 by the first transistor MN1 of the buffer input control circuit 120, that is, the buffer input voltage Vpm may be controlled. A control operation or an operation principle for the buffer input voltage Vpm will be described in some additional detail hereafter.

The buffer circuit 130 may receive the voltage apparent at the first node n1 (i.e., the buffer input voltage Vpm), and variably adjust (or buffer) the buffer input voltage Vpm in order to generate the gate voltage Vg.

The pass transistor 140 may include the third transistor MN3. The third transistor MN3 may be connected between an input voltage VSUP and the zeroth node n0 and operate in response to the gate voltage Vg. For example, the drain terminal of the third transistor MN3 may be connected to the input voltage VSUP, the source terminal may be connected to the zeroth node n0, and the gate terminal may be connected to the gate voltage Vg.

In some embodiments, the voltage regulator 100 may further include an output capacitor C0 connected between the zeroth node n0 and ground voltage. In some embodiments, as will be described hereafter, the voltage regulator 100 of FIG. 4—consistent with embodiments of the inventive concept, may quickly compensate for change in the output voltage VOUT through the fast feedback loop FL, such that the size of the output capacitor C0 may be markedly reduced, as compared for example with the size of the output capacitor (C0) in the comparative example of FIG. 2.

As noted above, the voltage regulator 100 may control the buffer input voltage Vpm using the slow feedback voltage Vsf or the fast feedback voltage Vff, thereby quickly stabilizing the output voltage VOUT. Certain operating schemes associated with the voltage regulators according to embodiments of the inventive concept will be described hereafter in some additional detail.

Figure 5:
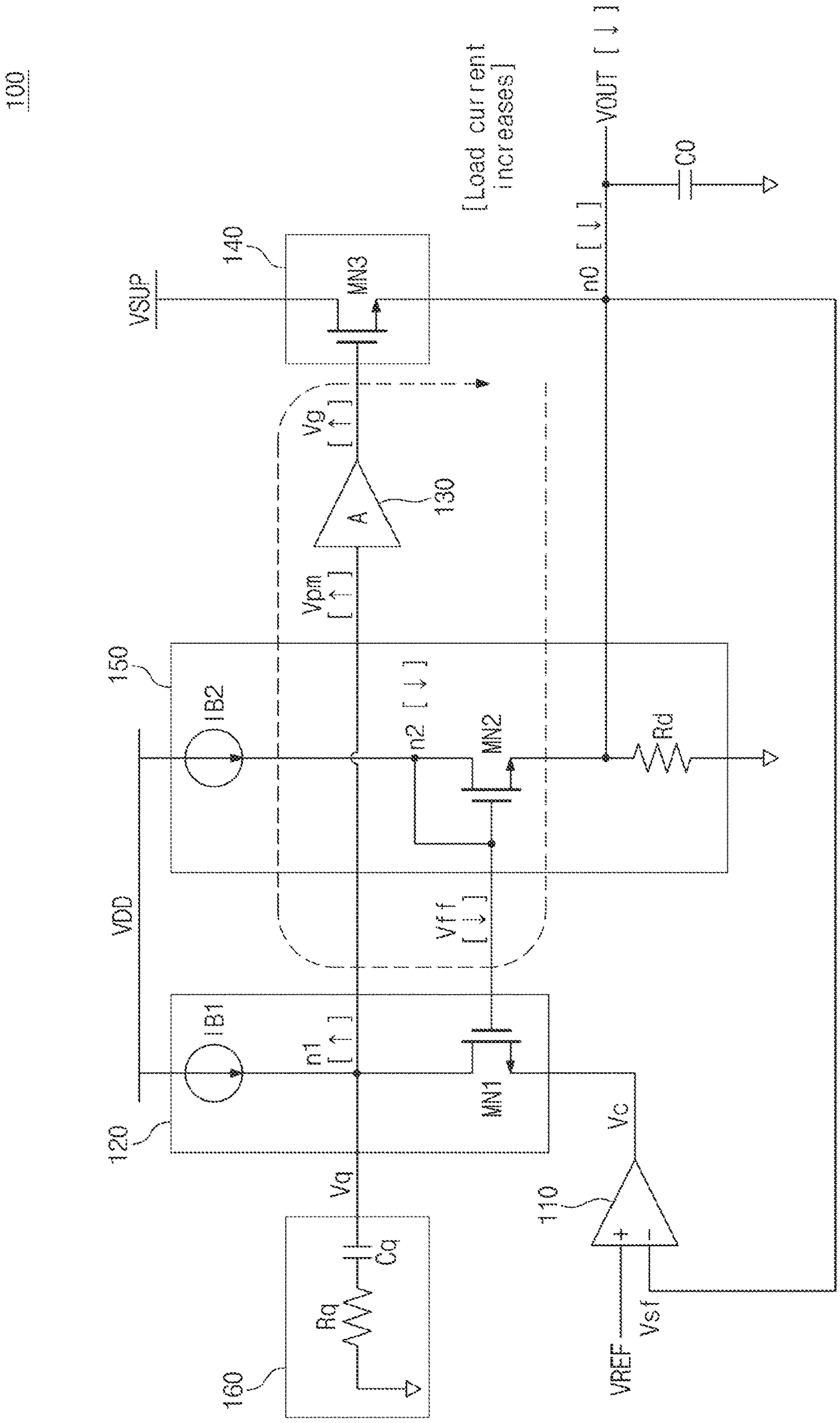
FIGS. 5 and 6 are respective circuit diagrams further illustrating possible operation of the voltage regulator of FIG. 4.
Figure 6:
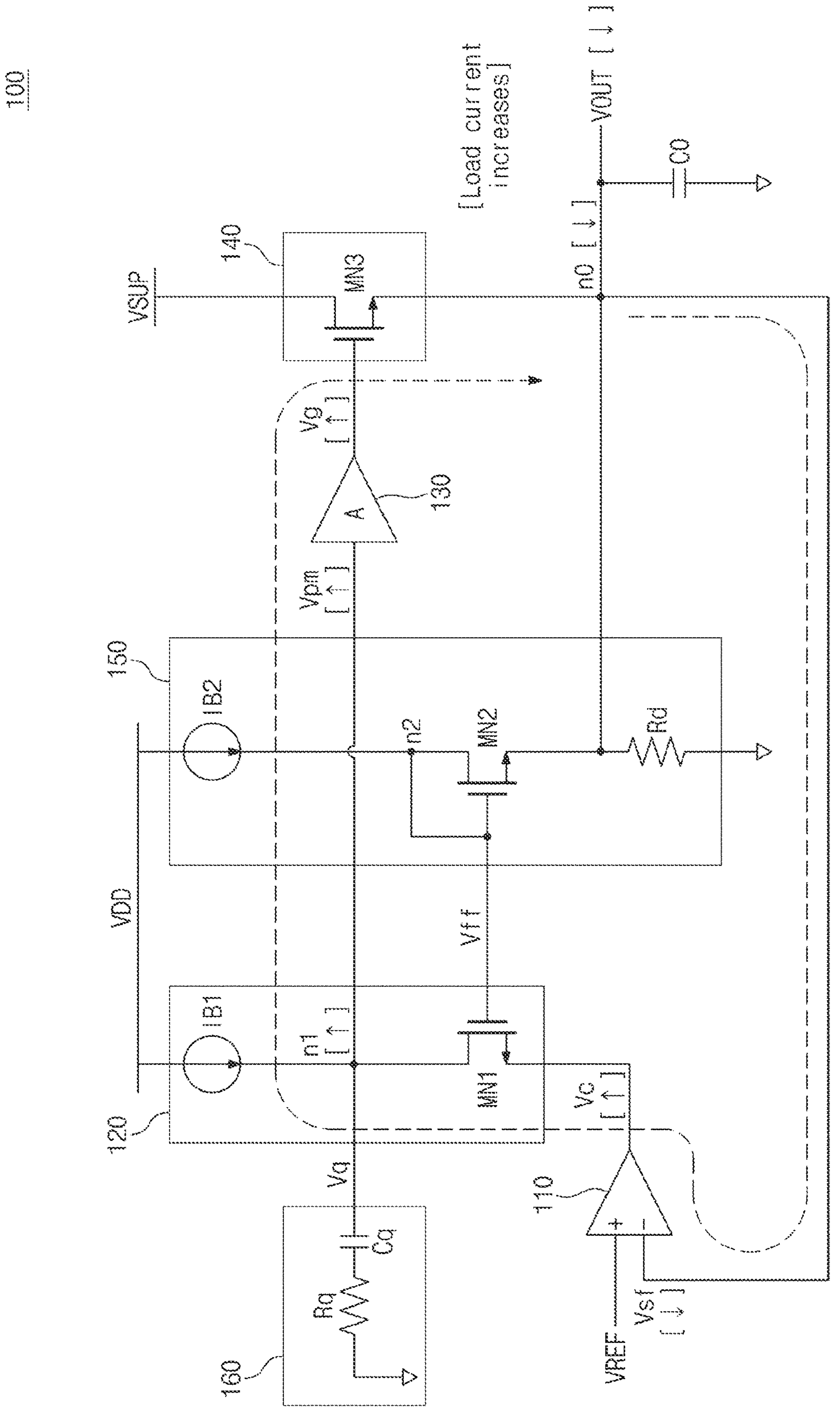

FIGS. 5 and 6 are respective circuit diagrams further illustrating operation of the voltage regulator 100 of FIG. 4. Here, operation of the voltage regulator 100 will be described under an assumption that a load current associated with the load circuit 12 of FIG. 1 increases.

Referring to FIGS. 1, 4, 5 and 6, the voltage regulator 100 may again include the compensator 110, the buffer input control circuit 120, the buffer circuit 130, the pass transistor 140, the fast voltage compensating circuit 150, and the damping control circuit 160. In this regard, a fast compensation operation for the output voltage VOUT through the fast feedback loop FL will be described with reference to FIG. 5.

For example, when the output voltage VOUT is at a target level (i.e., when the output voltage VOUT is in a stable state), various voltages (e.g., Vsf, Vff, Vq, Vpm, and Vg) may be maintained at constant levels. In this case, the load current used in the load circuit 12 may rapidly increase. In this case, the level of the output voltage VOUT connected to the load circuit 12 decrease, and accordingly, the voltage apparent at zeroth node n0 may decrease.

When the voltage of the zeroth node n0 decreases, the voltage of the second node n2 decreases. For example, the fast voltage compensating circuit 150 may have a common gate amplifier structure responsive to change in a voltage apparent at the zeroth node n0. In this case, when the voltage of the zeroth node n0 (i.e., the source voltage of the second transistor MN2) decreases, the voltage of the second node n2 (i.e., the drain voltage of the second transistor MN2) decreases. Accordingly, the fast feedback voltage Vff generated through the second node n2 may be relatively low.

As the fast feedback voltage Vff decreases, the voltage apparent at the first node n1 may increase by the buffer input control circuit 120. For example, the first transistor MN1 of the buffer input control circuit 120 may have a common source amplifier structure responsive to change in the fast feedback voltage Vff. In this case, when the gate voltage (i.e., the fast feedback voltage Vff) of the first transistor MN1 decreases, the drain voltage (i.e., the voltage of the first node n1) of the first transistor MN1 increases.

When the voltage of the first node n1 increases, the buffer input voltage Vpm increases. As the buffer input voltage Vpm increases, the gate voltage Vg output from the buffer circuit 130 increases. As the gate voltage Vg increases, the voltage of the zeroth node n0 increases. For example, in response to change in the gate voltage Vg, which is the pass transistor 140, the third transistor MN3 may operate as a source follower. In this case, as the gate voltage (i.e., Vg) of the third transistor MN3 increases, the source voltage (i.e., the voltage apparent at the zeroth node n0) of the third transistor MN3 increases.

As noted above, when the output voltage VOUT decreases, the fast feedback voltage Vff is relatively reduced by the fast voltage compensating circuit 150, and due to the relatively low fast feedback voltage Vff, the buffer input voltage Vpm may relatively increase. As the buffer input voltage Vpm increases, the gate voltage Vg may increase, and the voltage apparent at the zeroth node n0 may increase due to the increased gate voltage Vg. Accordingly, it is possible to quickly compensate for the decrease in the output voltage VOUT by increasing the voltage apparent at the zeroth node n0.

In some embodiments, the resistor Rd included in the fast voltage compensating circuit 150 may be used for standby operation of the fast voltage compensating circuit 150. For example, the resistor Rd included in the fast voltage compensating circuit 150 may be set to a size capable of discharging currents generated from the first current bias IB1 of the buffer input control circuit 120 and the second current bias IB2 included in the fast voltage compensating circuit 150.

A stabilization operation for the output voltage VOUT through the slow feedback loop SL will now be described with reference to FIG. 6. For example, when the output voltage VOUT is at a target level (i.e., when the output voltage VOUT is in a stable state), various voltages (e.g., Vsf, Vff, Vq, Vpm, Vg, and the like) may be maintained at a constant level. In this case, the load current used in the load circuit 12 may abruptly increase. In this case, the level of the output voltage VOUT connected to the load circuit 12 may decrease, and accordingly, the voltage of the zeroth node n0 may decrease.

As the voltage of the zeroth node n0 decreases, the slow feedback voltage Vsf, which is a voltage obtained by sampling or dividing the voltage of the zeroth node n0, may decrease. The slow feedback voltage Vsf may be lower than the reference voltage VREF. In this case, the comparison voltage Vc output from the compensator 110 may relatively increase.

As the comparison voltage Vc increases, the voltage of the first node n1 may increase by the buffer input control circuit 120. For example, in response to change in the comparison voltage Vc, the buffer input control circuit 120 may operate as a common gate amplifier. In this case, the comparison voltage Vc may be provided to the source terminal of the first transistor MN1 of the buffer input control circuit 120. Accordingly, when the comparison voltage Vc increases, the voltage of the first node n1—that is the drain terminal of the first transistor MN1 may increase.

As the voltage of the first node n1 increases, the buffer input voltage Vpm may increase. As the buffer input voltage Vpm increases, the gate voltage Vg output from the buffer circuit 130 may increase. As the gate voltage Vg increases, the voltage of the zeroth node n0 may increase by the third transistor MN3 which serves as the pass transistor 140. As the voltage of the zeroth node n0 increases, a decrease in the output voltage VOUT may be compensated, and the output voltage VOUT may be maintained at a target level.

As described above, when the output voltage VOUT decreases, the comparison voltage Vc is relatively increased by the compensator 110, and by the relatively increased comparison voltage Vc, the buffer input voltage Vpm may be relatively increased. As the buffer input voltage Vpm increases, the gate voltage Vg may increase, and the voltage of the zeroth node n0 may increase due to the increased gate voltage Vg. It is possible to compensate for decrease in the output voltage VOUT by an increase in the voltage of the zeroth node n0, thereby maintaining the output voltage VOUT at a target level.

Although the fast compensation operation for the output voltage VOUT through the fast feedback loop FL, and the stabilization operation for the output voltage VOUT through the slow feedback loop SL have been individually described in relation to FIGS. 5 and 6, embodiments of the inventive concept are not limited thereto. For example, the fast compensation operation and the stabilization operation may be performed in parallel (e.g., temporarily overlapping at least in part) or sequentially. For example, when the output voltage VOUT rapidly decreases, a fast compensation operation for the output voltage VOUT through the fast feedback loop FL may first be performed, so that it is possible to compensate for an initial decrease in the output voltage VOUT. Thereafter, a stabilization operation for the output voltage VOUT through the slow feedback loop SL may be performed, so that it is possible to stably maintain the output voltage VOUT at a target level. Accordingly, voltage regulators according to embodiments of the inventive concept can quickly compensate the output voltage VOUT and stably maintain the output voltage VOUT at a target level.

For convenience of description, certain embodiments in which a load current associated with the load circuit 12 increases have been described in relation to FIGS. 5 and 6, but embodiments of the inventive concept are not limited thereto. For example, when the load current associated with the load circuit 12 decreases, the output voltage VOUT may increase. In this case, in the voltage regulator 100, through the fast feedback loop FL, the fast feedback voltage Vff may increase, the voltage of the first node n1 may decrease, the buffer input voltage Vpm may decrease, the gate voltage Vg may decrease, and the voltage of the zeroth node n0 may decrease. Accordingly, it is possible to quickly compensate for an increase in the output voltage VOUT. In addition, in the voltage regulator 100, through the slow feedback loop SL, the slow feedback voltage Vsf may decrease, the comparison voltage Vc may decrease, the voltage of the first node n1 may decrease, the buffer input voltage Vpm may decrease, the gate voltage Vg may decrease, and the voltage of the zeroth node n0 may decrease. Accordingly, it is possible to stably maintain the output voltage VOUT at a target level.

In some embodiments, the voltage regulator 100 may be configured to control the buffer input voltage Vpm input to the buffer circuit 130 through the fast feedback loop FL. In this case, it is possible to provide a faster response characteristics in relation to an abrupt change in the output voltage VOUT. For example, the buffer circuit 130 may be a unity buffer that may be modeled as a current bias and a PMOS transistor. In this case, the output impedance (i.e., the impedance at the terminal from which the gate voltage Vg is output) of the buffer circuit 130 may be relatively larger than the input impedance (i.e., the impedance at the terminal to which the buffer input voltage Vpm is input). That is, when the output terminal (i.e., the gate voltage Vg) of the buffer circuit 130 is directly controlled, accurate control and driving may be difficult due to a relatively large output impedance. Alternately, because the voltage regulator 100 controls the buffer input voltage Vpm, which is the input of the buffer circuit 130, through the fast feedback loop FL, it may be relatively easy to control and drive.

Figure 7:
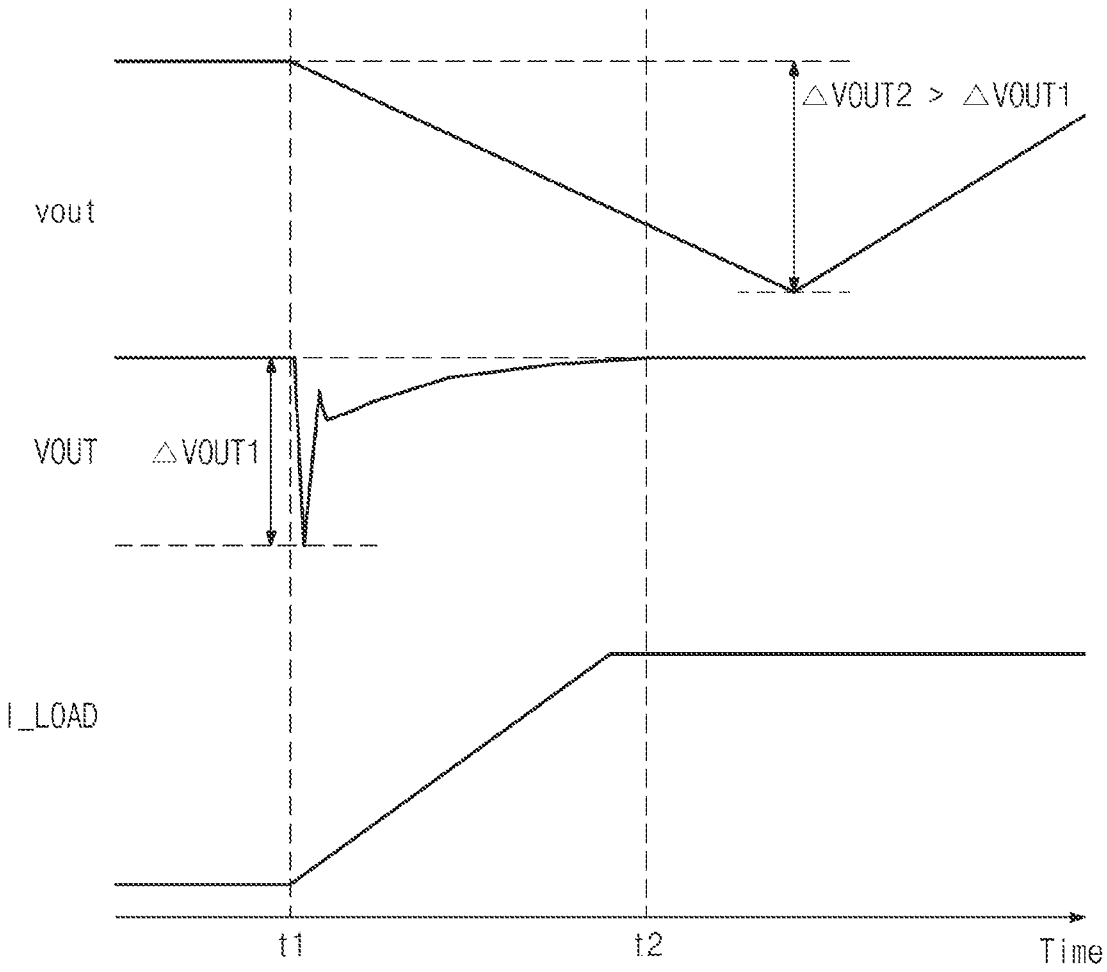
FIG. 7 is a voltage waveform graph further illustrating certain operating characteristics of the voltage regulator of FIG. 4.

FIG. 7 is a waveform graph illustrating certain operating characteristics for the voltage regulator 100 of FIG. 4. For convenience of description, an embodiment is assumed that a load current I_LOAD associated with the load circuit 12 increases.

Referring to FIGS. 1, 2, 4 and 7, the load current I_LOAD associated with the load circuit 12 is assumed to increase at time t1. As the load current I_LOAD increases, the output voltage VOUT output from the voltage regulator 100 decreases. In this case, the voltage regulator 100 may quickly compensate for a decrease in the output voltage VOUT through the fast feedback loop FL and through the slow feedback loop SL, and may operate to maintain the output voltage VOUT at a target level. In this case, the actual decrease in the output voltage VOUT by the voltage regulator 100 may be a first decrease ΔVOUT1. In addition, the output voltage VOUT by the voltage regulator 100 may stably maintain beginning at a second time t2.

In contrast, an actual decrease in the output voltage by the voltage regulator of FIG. 2 may be a second decrease amount ΔVOUT2, wherein the second decrease amount ΔVOUT2 is greater than the first decrease amount ΔVOUT1 associated with the voltage regulator 100. In addition, the output voltage by the voltage regulator of FIG. 2 may be stabilized substantially after the second time t2. That is, the voltage regulator 100 may quickly compensate change in the output voltage VOUT through the fast feedback loop FL, and may stably maintain the output voltage VOUT at a target level through the slow feedback loop SL.

Referring to FIGS. 1, 3, 4 and 8, a voltage regulator 100-1 may include the compensator 110, the buffer input control circuit 120, the buffer circuit 130, the pass transistor 140, a fast voltage compensating circuit 150-1, and the damping control circuit 160.

Of note in this regard, the fast voltage compensating circuit 150 described in relation to FIG. 4 includes the resistor Rd connected between the zeroth node n0 and ground voltage. Accordingly, the resistor Rd may be set to a size capable of discharging currents generated from the first current bias IB1 of the buffer input control circuit 120 and the second current bias IB2 included in the fast voltage compensating circuit 150, such that current flowing through the resistor Rd may vary according to the magnitude of the output voltage VOUT.

Figure 8:
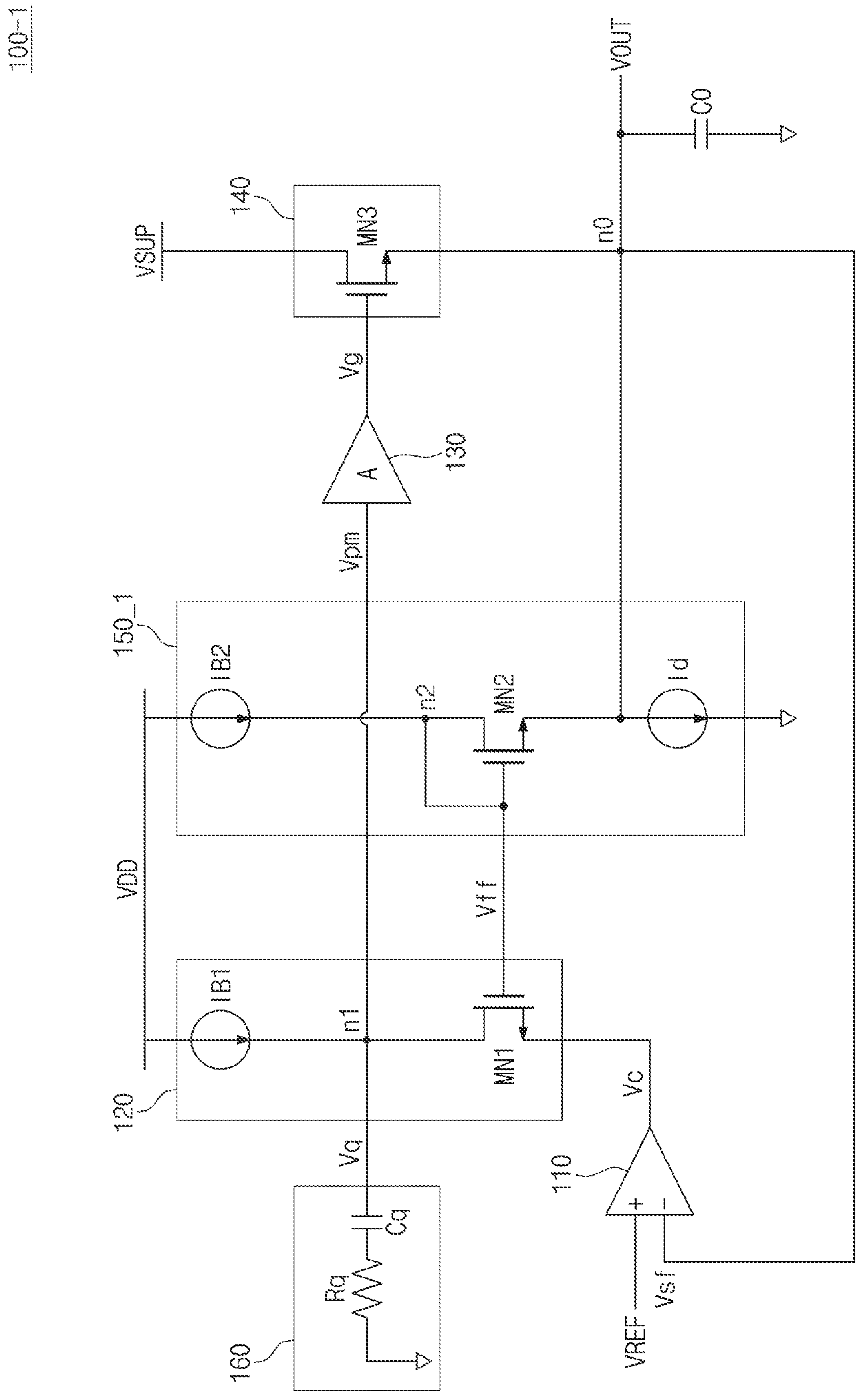
FIGS. 8, 9, 10, 11 and 12 are respective circuit diagrams illustrating in various examples the voltage regulator 100 of FIGS. 1, 3 and 4.

In contrast, the fast voltage compensating circuit 150-1 of FIG. 8 may include an additional current source Id connected between the zeroth node n0 and ground voltage, wherein the additional current source Id may be a constant current source configured to provide a constant current. In this case, regardless of the magnitude of the output voltage VOUT, the voltage regulator 100-1 may operate at a constant current.

Referring to FIGS. 1, 3, 4 and 9, a voltage regulator 100-2 may include the compensator 110, the buffer input control circuit 120, the buffer circuit 130, the pass transistor 140, the fast voltage compensating circuit 150, and the damping control circuit 160. Furthermore the operations and configuration of the compensator 110, the buffer input control circuit 120, the buffer circuit 130, the pass transistor 140, the fast voltage compensating circuit 150, and the damping control circuit 160 may be substantially the same as previously described in relation to FIGS. 4, 5 and 6.

Figure 9:
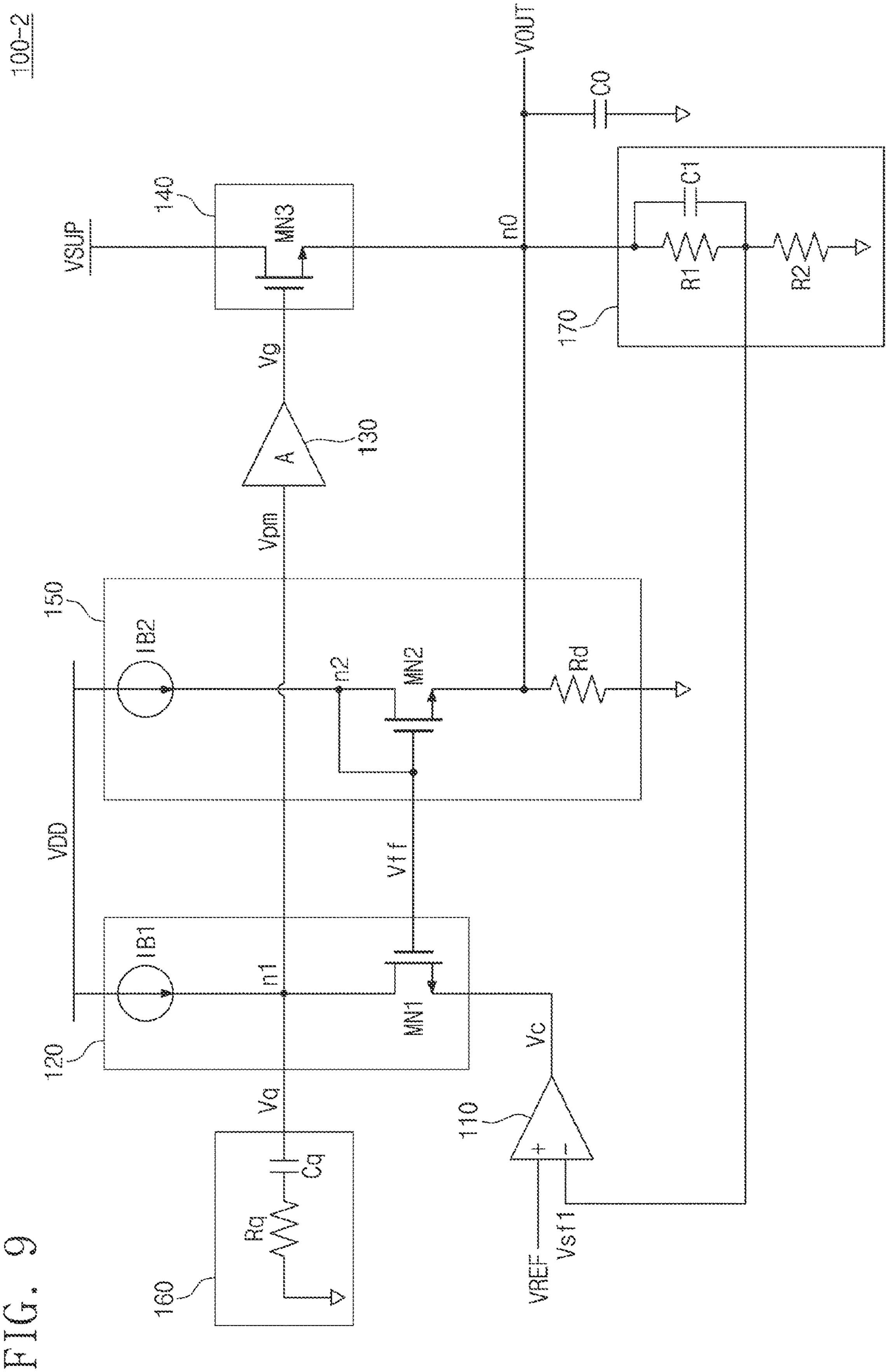
Figure 10:
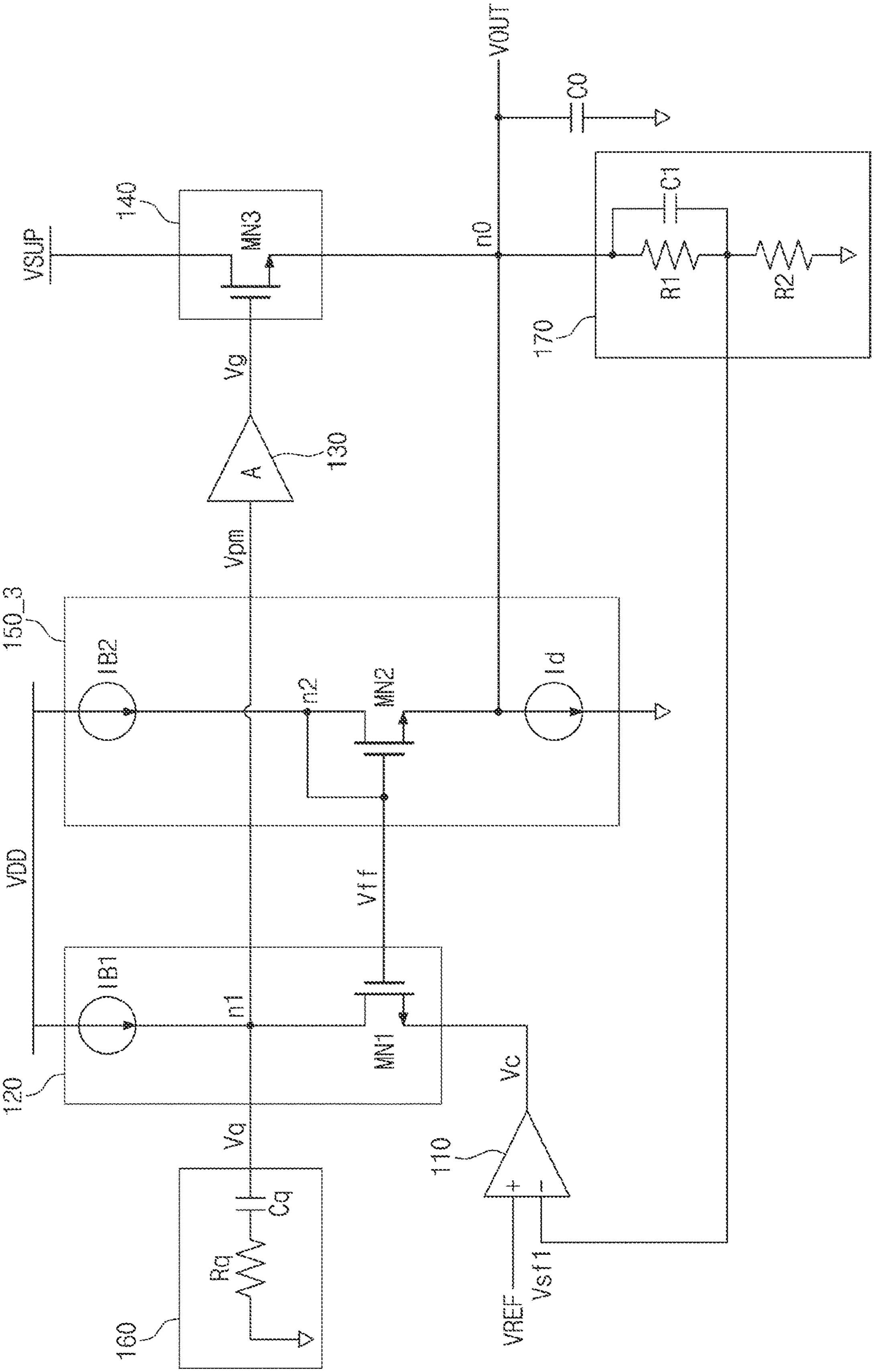

However, the voltage regulator 100-2 of FIG. 9 may further include a voltage divider circuit 170, wherein the voltage divider circuit 170 is configured to divide the output voltage VOUT in order to generate the first slow feedback voltage Vsf1. For example, the voltage divider circuit 170 may include a first resistor R1, a second resistor R2, and a first capacitor C1. The first and second resistors R1 and R2 may be connected in series between the zeroth node n0 and ground voltage. The first capacitor C1 may be connected in parallel with the first resistor R1.

The first slow feedback voltage Vsf1 may be provided through a node between the first and second resistors R1 and R2. That is, the first slow feedback voltage Vsf1 may have a size in which the output voltage VOUT is divided by the resistance values of the first and second resistors R1 and R2. In this case, even when the reference voltage VREF is a fixed value, the level or target level of the output voltage VOUT may be controlled by adjusting the resistance values of the resistors R1 and R2 included in the voltage divider circuit 170.

Referring to FIGS. 1, 3, 4 and 10, a voltage regulator 100-3 may include the compensator 110, the buffer input control circuit 120, the buffer circuit 130, the pass transistor 140, a fast voltage compensating circuit 150-3, the damping control circuit 160, and the voltage divider circuit 170. Here, the compensator 110, the buffer input control circuit 120, the buffer circuit 130, the pass transistor 140, the damping control circuit 160, and the voltage divider circuit 170 may be substantially similar to those described in relation to FIG. 9.

However, the voltage regulator 100-3 may replace the fast voltage compensating circuit 150 of FIG. 4 with a fast voltage compensating circuit 150-3 including the current source Id connected between the zeroth node n0 and ground voltage, as described in relation to FIG. 8.

Referring to FIGS. 1, 3, 4 and 11, a voltage regulator 100-4 may include the compensator 110, the buffer input control circuit 120, the buffer circuit 130, the pass transistor 140, the fast voltage compensating circuit 150, and the damping control circuit 160. Here again operations and possible configuration of the compensator 110, the buffer input control circuit 120, the buffer circuit 130, the pass transistor 140, the fast voltage compensating circuit 150, and the damping control circuit 160 may be substantially the same as that described in relation to FIGS. 4, 5 and 6.

Figure 11:
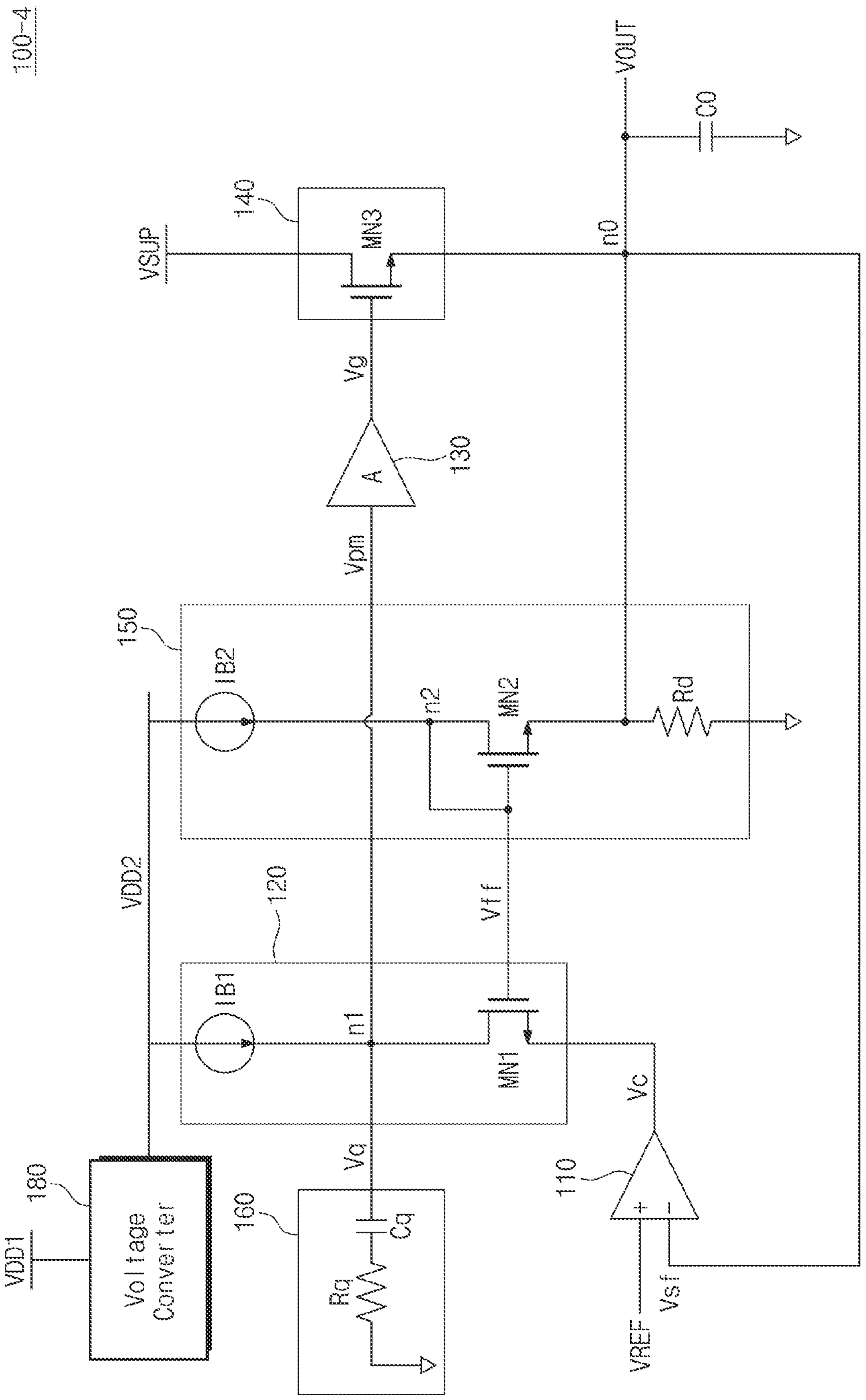
Figure 12:
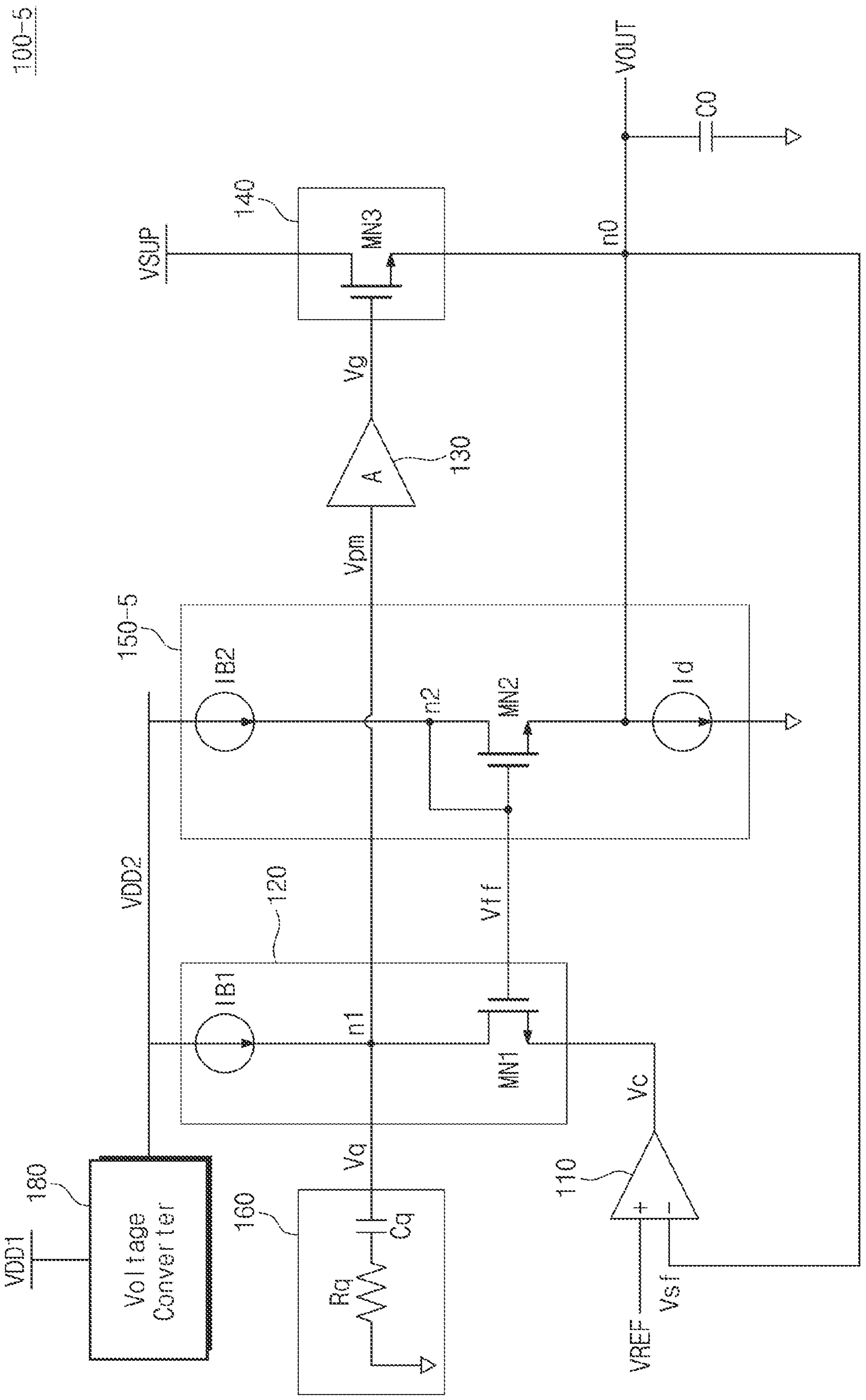

However, the voltage regulator 100-4 of FIG. 11 may further include a voltage converter 180, wherein the voltage converter 180 is configured to receive a first power source voltage VDD1 and convert the first power source voltage VDD1 to a second power source voltage VDD2. In this regard, the first current bias IB1 of the buffer input control circuit 120 and the second current bias IB2 of the fast voltage compensating circuit 150 may be connected with the second power source voltage VDD2 generated from the voltage converter 180. In some embodiments, the compensator 110 may operate using the first or second power source voltage VDD1 or VDD2.

In some embodiments, the voltage converter 180 may be a switching regulator configured to convert the first power source voltage VDD1 to the second power source voltage VDD2. In some embodiments, the voltage converter 180 may be one of various voltage conversion circuits such as a buck converter, a boost converter, a buck-boost converter, a charge pump, and the like.

As shown in FIG. 11, the voltage regulator 100-4 may operate using the second power source voltage VDD2 converted by the voltage converter 180, thereby expanding the operating range of the output voltage VOUT. For example, by controlling the voltage converter 180 to increase the second power voltage VDD2, the target level of the output voltage VOUT may be increased. Alternately, when the target level of the output voltage VOUT is lowered, a low voltage or low power operation of the voltage regulator 100-4 may be implemented by controlling the voltage converter 180 to lower the second power source voltage VDD2.

Referring to FIGS. 1, 3, 4 and 12, a voltage regulator 100-5 may include the compensator 110, the buffer input control circuit 120, the buffer circuit 130, the pass transistor 140, a fast voltage compensating circuit 150-5, the damping control circuit 160, and the voltage divider circuit 170. Here again, the compensator 110, the buffer input control circuit 120, the buffer circuit 130, the pass transistor 140, the damping control circuit 160, and the voltage divider circuit 170 may be substantially similar to those described in relation to FIG. 10.

However, the voltage regulator 100-5 may replace the fast voltage compensating circuit 150 of FIG. 9 with a fast voltage compensating circuit 150-5 including the current source Id connected between the zeroth node n0 and ground voltage, as described in relation to FIG. 8.

As described above, the voltage regulator 100 of FIGS. 1, 3 and 4 according to embodiments of the inventive concept may be used to quickly compensate for abrupt change in the output voltage VOUT through the fast feedback loop FL and through the slow feedback loop SL to stably maintain the output voltage VOUT at a target voltage. Additionally or alternately, voltage regulators 100-1, 100-2, 100-3, 100-4 and 100-5 of FIGS. 8, 9, 10, 11, and 12 may be implemented according to other embodiments of the inventive concept.

In some embodiments, the first transistor MN1 of the buffer input control circuit 120 and the second transistor MN2 of the fast voltage compensating circuit 150 may have the same physical characteristics. For example, the first transistor MN1 and the second transistor MN2 may be designed to have the same ratio of the channel width to the channel length (i.e., W/L ratio). Alternately however, the first transistor MN1 and the second transistor MN2 may be designed to have different ratios (i.e., W/L ratio) of channel length to channel width. When the ratio (i.e., W/L ratio) of the channel width to the channel length of the first transistor MN1 is different from that of the second transistor MN2, the range of the output voltage VOUT controllable by the voltage regulator 100 may vary.

In some embodiments, the first current bias IB1 of the buffer input control circuit 120 and the second current bias IB2 of the fast voltage compensating circuit 150 may be configured to flow constant currents having about the same magnitude. Alternately however, the first current bias IB1 of the buffer input control circuit 120 and the second current bias IB2 of the fast voltage compensating circuit 150 may be configured to flow constant currents having different magnitudes. In this case, the range of the output voltage VOUT controllable by the voltage regulator 100 may vary.

Figure 13:
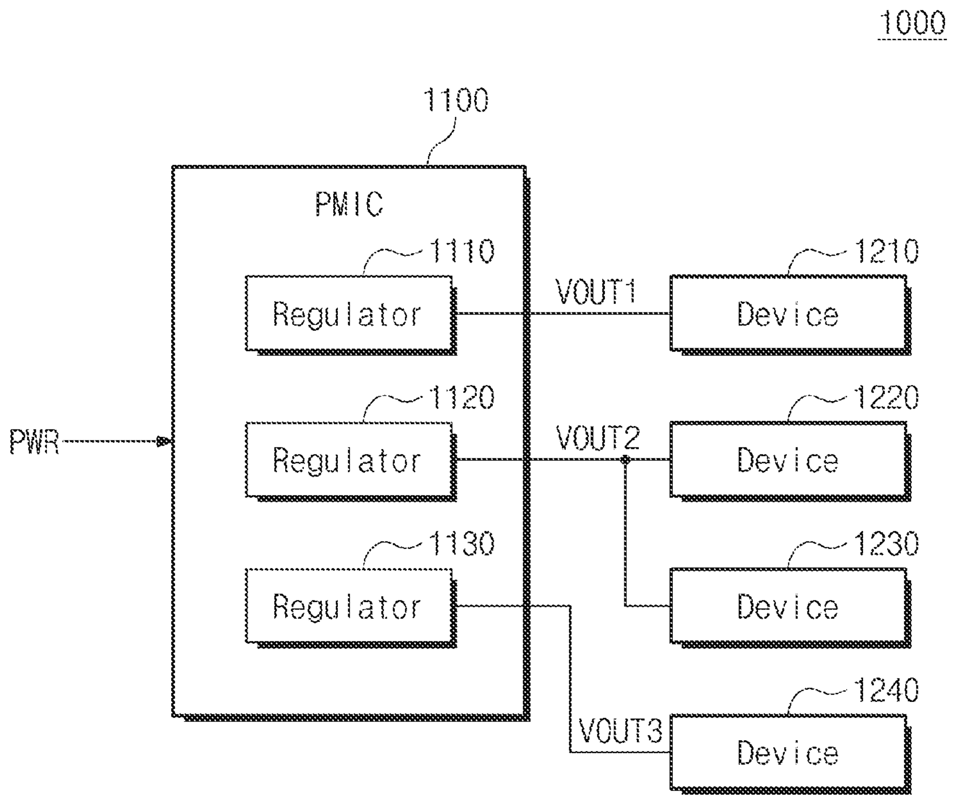
FIGS. 13, 14 and 15 are respective block diagrams illustrating various electronic systems including at least one voltage regulator according to embodiments of the inventive concept.
Figure 14:
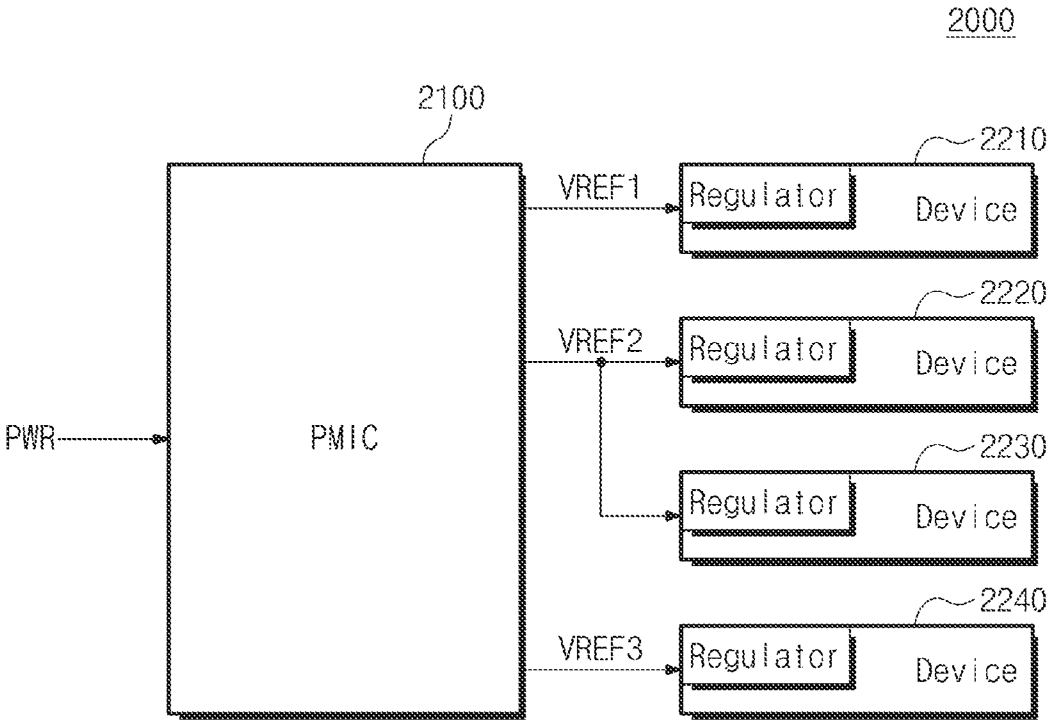
Figure 15:
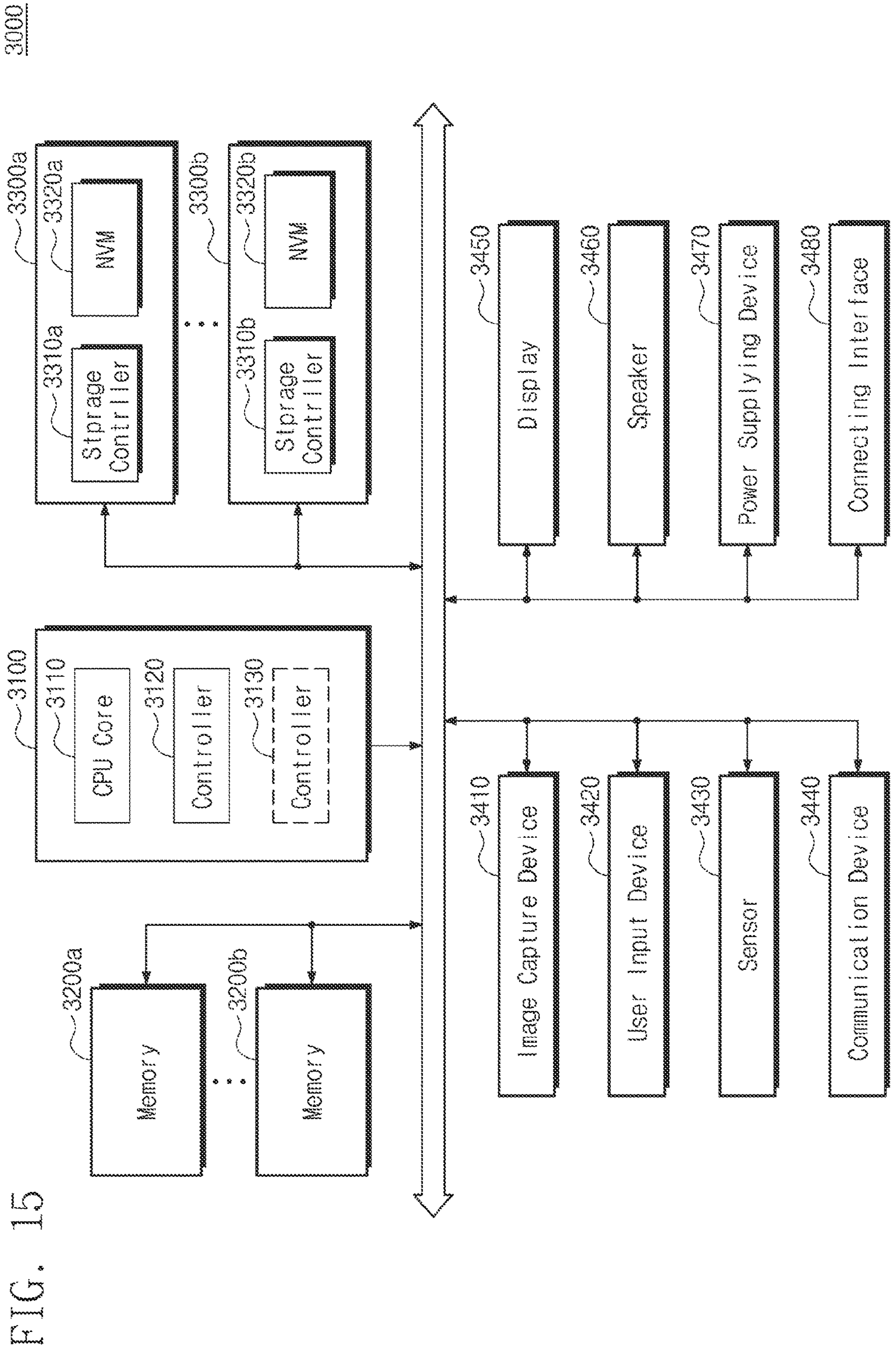

FIGS. 13, 14 and 15 are respective block diagrams illustrating certain electronic devices including at least one voltage regulator according to embodiments of the inventive concept.

Referring to FIG. 13, an electronic device 1000 may include a PMIC 1100 configured to provide one or more output voltages (e.g., VOUT1, VOUT2, and VOUT3) to a plurality of component devices 1210, 1220, 1230 and 1240 (hereafter collectively, "1210 to 1240"). Here, for example, the electronic device 1000 may be implemented as part of a mobile communication device, a PDA, a PMP, a digital camera, a smart phone, a tablet PC, a laptop PC or a wearable device. In some embodiments, the electronic device 1000 may be implemented as a system-on-chip (SoC) or a system-on-package (SoP).

The PMIC 1100 may be configured to receive an external power signal PWR and generate the plurality of output voltages (e.g., VOUT1, VOUT2 and VOUT3) in response to the external power signal PWR. In the illustrated example of FIG. 13, the PMIC 1100 includes a first voltage regulator 1110 configured to generate the first output voltage VOUT1, a second voltage regulator 1120 configured to generate the second output voltage VOUT2, and a third voltage regulator 1130 configured to generate the third output voltage VOUT3.

Of particular note, one or more of the first, second and third voltage regulators 1110, 1120 and 1130 may include at least one voltage regulator implemented and operated in accordance with embodiments of the inventive concept (e.g., voltage regulators 100, 100-1, 100-2, 100-3, 100-4 and 100-5).

The plurality of component devices 1210 to 1240 may include an electronic circuit or a logic circuit configured to support various operations of the electronic device 1000, or a memory circuit. The plurality of component devices 1210 to 1240 may receive power from the PMIC 1100 and operate in accordance with the received power. For example, the first component device 1210 may receive the first output voltage VOUT1 from the PMIC 1100 and operate in response to the first output voltage VOUT1. Each of the second and third component devices 1220 and 1230 may receive the second output voltage VOUT2 from the PMIC 1100 and operate in response to the second output voltage VOUT2. And the fourth component device 1240 may receive the third output voltage VOUT3 from the PMIC 1100 and operate in response to the third output voltage VOUT3.

In some embodiments, the various output voltages (e.g., VOUT1, VOUT2 and VOUT3) may have different levels. Accordingly, the voltage regulators (e.g., 1110, 1120 and 1130) may generate respective output voltages in response to different reference voltages. Alternately, the voltage regulators may generate the output voltages in response to different voltage dividing ratios (e.g., as controlled by the voltage divider circuit 170 of FIG. 9). Alternately, the voltage regulators may generate the output voltages in response to different power source voltages generated by different voltage converters.

Referring to FIG. 14, an electronic device 2000 may include a PMIC 2100 and a plurality of component devices (e.g., 2210, 2220, 2230 and 2240—hereafter collectively, "2210 to 2240").

Here, the PMIC 2100 may generate multiple reference voltages (e.g., VREF1, VREF2 and VREF3) from an externally provided power signal PWR. For example, the PMIC 2100 may generate the reference voltages using a reference voltage generator.

Each of the plurality of component devices 2210 to 2240 may receive (and operate in response to) at least one of the reference voltages provided by the PMIC 2100. In this regard, each of the plurality of component devices 2210 to 2240 may include at least one voltage regulator consistent with embodiments of the inventive concept. Thus, a first voltage regulator associated with the first component device 2210 may generate a first operating voltage in response to the first reference voltage VREF1; a second voltage regulator associated with the second component device 2220 may generate a second operating voltage in response to the second reference voltage VREF2; a third voltage regulator associated with the third component device 2230 may generate a third operating voltage in response to the second reference voltage VREF2; and a fourth voltage regulator associated with the fourth component device 2240 may generate a fourth operating voltage in response to the third reference voltage VREF3.

Here, two or more of the operating voltages generated in relation to one or more of the reference voltages may be the same. For example, the second and third operating voltages generated from voltage regulators respectively associated with of the second and third component devices 2220 and 2230 may be the same. Alternately, operating voltages generated using the same reference voltage may have different levels. For example, the second and third operating voltages generated by voltage regulators respectively associated with the second and third component devices 2220 and 2230 may be different.

Referring to FIG. 15, a mobile electronic device 3000 may, for example, be variously implemented as a mobile phone, a smartphone, a tablet PC, a wearable device, a healthcare device, or an Internet of things (IOT) device.

In some embodiments, the system 3000 may include a main processor 3100, memories (e.g., 3200*a* and 3200*b*), and storage devices (e.g., 3300*a* and 3300*b*). In addition, the system 3000 may include at least one of an image capturing device 3410, a user input device 3420, a sensor 3430, a communication device 3440, a display 3450, a speaker 3460, a power supplying device 3470, and a connecting interface 3480.

The main processor 3100 may control all operations of the system 3000, more specifically, operations of other components included in the system 3000. The main processor 3100 may be implemented as a general-purpose processor, a dedicated processor, or an application processor.

The main processor 3100 may include at least one CPU core 3110 and further include a controller 3120 configured to control the memories 3200*a* and 3200*b* and/or the storage devices 3300*a* and 3300*b*. In some embodiments, the main processor 3100 may further include an accelerator 3130, which is a dedicated circuit for a high-speed data operation, such as an artificial intelligence (AI) data operation. The accelerator 3130 may include a graphics processing unit (GPU), a neural processing unit (NPU) and/or a data processing unit (DPU) and be implemented as a chip that is physically separate from the other components of the main processor 3100.

The memories 3200*a* and 3200*b* may be used as main memory devices of the system 3000. Although each of the memories 3200*a* and 3200*b* may include a volatile memory, such as static random access memory (SRAM) and/or dynamic RAM (DRAM), each of the memories 3200*a* and 3200*b* may include non-volatile memory, such as a flash memory, phase-change RAM (PRAM) and/or resistive RAM (RRAM). The memories 3200*a* and 3200*b* may be implemented in the same package as the main processor 3100.

The storage devices 3300*a* and 3300*b* may serve as non-volatile storage devices configured to store data regardless of whether power is supplied thereto, and have larger storage capacity than the memories 3200*a* and 3200*b*. The storage devices 3300*a* and 3300*b* may respectively include storage controllers (STRG CTRL) 3310*a* and 3310*b* and NVM (Non-Volatile Memory)s 3320*a* and 3320*b* configured to store data via the control of the storage controllers 3310*a* and 3310*b*. Although the NVMs 3320*a* and 3320*b* may include flash memories having a two-dimensional (2D) structure or a three-dimensional (3D) V-NAND structure, the NVMs 3320*a* and 3320*b* may include other types of NVMs, such as PRAM and/or RRAM.

The storage devices 3300*a* and 3300*b* may be physically separated from the main processor 3100 and included in the system 3000 or implemented in the same package as the main processor 3100. In addition, the storage devices 3300*a* and 3300*b* may have types of solid-state devices (SSDs) or memory cards and be removably combined with other components of the system 300 through an interface, such as the connecting interface 3480 that will be described below. The storage devices 3300*a* and 3300*b* may be devices to which a standard protocol, such as for example, a universal flash storage (UFS), an embedded multi-media card (eMMC), and/or a non-volatile memory express (NVMe), are applied.

The image capturing device 3410 may capture still images or moving images. The image capturing device 3410 may include a camera, a camcorder, and/or a webcam.

The user input device 3420 may receive various types of data input by a user of the system 3000 and include a touch pad, a keypad, a keyboard, a mouse, and/or a microphone.

The sensor 3430 may detect various types of physical quantities, which may be obtained from the outside of the system 3000, and convert the detected physical quantities into electric signals. The sensor 3430 may include a temperature sensor, a pressure sensor, an illuminance sensor, a position sensor, an acceleration sensor, a biosensor, and/or a gyroscope sensor.

The communication device 3440 may transmit and receive signals between other devices outside the system 3000 according to various communication protocols. The communication device 3440 may include an antenna, a transceiver, and/or a modem.

The display 3450 and the speaker 3460 may serve as output devices configured to respectively output visual information and auditory information to the user of the system 3000.

The power supplying device 3470 may appropriately convert power supplied from a battery (not shown) embedded in the system 3000 and/or an external power source, and supply the converted power to each of components of the system 3000.

The connecting interface 3480 may provide connection between the system 3000 and an external device, which is connected to the system 3000 and capable of transmitting and receiving data to and from the system 3000. The connecting interface 3480 may be implemented using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

In some embodiments, the power supply device 3470, for example, may include at least one voltage regulator (or a PMIC including at least one voltage regulator) consistent with embodiments of the inventive concept. Thus, the power supply device 3470 may be configured to provide various power voltages to various components included in the electronic device 3000 using the at least one voltage regulator (or PMIC). Additionally or alternately, various other components included in the electronic device 3000 may include at least one voltage regulator consistent with embodiments of the inventive concept.

While the inventive concept has been described with reference to certain embodiments thereof, those skilled in the art will appreciate that various changes and modifications may be made thereto without departing from the scope of the inventive concept as set forth in the following claims.

What is claimed is:

1. A voltage regulator configured to output an output voltage, the voltage regulator comprising:

a compensator configured to compare a first feedback voltage corresponding to the output voltage with a reference voltage to output a comparison voltage;

a first current bias connected between a first power source voltage and a first node;

a first transistor connected between the first node and the comparison voltage, wherein a gate of the first transistor is configured to receive a voltage of a second node, and wherein a source of the first transistor is configured to receive the comparison voltage;

a buffer circuit configured to buffer a voltage of the first node to output a gate voltage;

a pass transistor connected between an input voltage and an output node through which the output voltage is output to operate in response to the gate voltage;

a second current bias connected between the first power source voltage and the second node; and a second transistor connected between the second node and the output node to operate in response to the voltage of the second node.

2. The voltage regulator of claim 1, further comprising:

a first resistor connected between the output node and a ground node.

3. The voltage regulator of claim 1, further comprising:

a first constant current source connected between the output node and a ground node.

4. The voltage regulator of claim 1, further comprising:

a second resistor and a first capacitor connected in series between the first node and a ground node.

5. The voltage regulator of claim 1, further comprising:

an output capacitor connected between the output node and a ground node.

6. The voltage regulator of claim 1, further comprising:

first and second resistors connected in series between the output node and a ground node; and a first capacitor connected in parallel with the first resistor, wherein the first feedback voltage is output through a node between the first and second resistors.

7. The voltage regulator of claim 1, further comprising:
a voltage converter configured to receive a second power source voltage and convert the second power source voltage to the first power source voltage.

8. The voltage regulator of claim 1, wherein each of the first transistor and the second transistor includes an n-type metal-oxide-semiconductor field-effect transistor (N-type MOSFET).

9. The voltage regulator of claim 8, wherein a first ratio (W/L ratio) of a channel width to a channel length of the first transistor is equal to a second ratio (W/L ratio) of a channel width to a channel length of the second transistor.

10. The voltage regulator of claim 8, wherein a first ratio (W/L ratio) of a channel width to a channel length of the first transistor is different from a second ratio (W/L ratio) of a channel width to a channel length of the second transistor.

11. A voltage regulator configured to output an output voltage, the voltage regulator comprising:
a compensator configured to compare a first feedback voltage corresponding to the output voltage with a reference voltage to output a comparison voltage;
a buffer circuit configured to buffer an buffer input voltage to generate a gate voltage;
a pass transistor configured to output the output voltage through an output node in response to the gate voltage;
a fast voltage compensating circuit configured to control a second feedback voltage based on a change in the output voltage; and
a buffer input control circuit configured to control the buffer input voltage based on the second feedback voltage and the comparison voltage,
wherein the fast voltage compensating circuit is configured to operate as a common gate amplifier for the change in the output voltage, and
wherein the buffer input control circuit is configured to operate as a common source amplifier for the second feedback voltage and as a common gate amplifier for the first feedback voltage,
wherein the buffer input control circuit comprises:
a transistor gate configured to receive, as input, a voltage that is a function of the second feedback voltage, and
a transistor source configured to receive, as input, a voltage that is a function of the first feedback voltage.

12. The voltage regulator of claim 11, further comprising:
a damping control circuit configured to generate a stabilization voltage for removing a high-frequency peaking of the buffer input voltage.

13. The voltage regulator of claim 11, wherein the buffer input control circuit includes:
a first current bias connected between a first power source voltage and a first node; and
a first transistor connected between the first node and the comparison voltage to operate in response to the second feedback voltage,
wherein the buffer input voltage is output through the first node.

14. The voltage regulator of claim 11, wherein the fast voltage compensating circuit includes:
a second current bias connected between a first power source voltage and a second node; and
a second transistor diode-connected between the second node and the output node, and
wherein the second feedback voltage is output through the second node.

15. The voltage regulator of claim 14, wherein the fast voltage compensating circuit further includes:
a first resistor connected between the output node and a ground voltage.

16. The voltage regulator of claim 14, wherein the fast voltage compensating circuit further includes:
a first constant current source connected between the output node and a ground voltage.

17. The voltage regulator of claim 11, further comprising:
a voltage divider circuit connected between the output node and a ground voltage to divide the output voltage by a predetermined ratio to output the first feedback voltage.

18. The voltage regulator of claim 11, further comprising:
a voltage converter configured to convert a first power source voltage into a second power source voltage,
wherein the buffer input control circuit and the fast voltage compensating circuit are configured to operate based on the second power source voltage output from the voltage converter.

19. An electronic device comprising:
a reference voltage generator configured to generate a reference voltage;
a voltage regulator configured to generate an output voltage corresponding to the reference voltage based on the reference voltage; and
a load circuit configured to operate based on the output voltage,
wherein, when the output voltage is different from a target level, the voltage regulator compensates for a difference between the output voltage and the target level through a fast feedback loop and maintains the output voltage at the target level through a slow feedback loop,
a first transistor of the voltage regulator is configured to operate as a common gate amplifier in the slow feedback loop, and
in the fast feedback loop, the first transistor of the voltage regulator is configured to operate as a common source amplifier and a second transistor of the voltage regulator is configured to operate as a common gate amplifier,
wherein the first transistor comprises a source configured to receive, as input, a voltage that is a function of the slow feedback loop, and
wherein the first transistor comprises a gate configured to receive, as input, a voltage that is a function of the fast feedback loop.

20. The electronic device of claim 19, wherein the voltage regulator includes:
a compensator configured to compare a first feedback voltage corresponding to the output voltage with the reference voltage to output a comparison voltage;
a first current bias connected between a first power source voltage and a first node,
wherein the first transistor is connected between the first node and the comparison voltage to operate in response to a voltage of a second node;
a buffer circuit configured to buffer a voltage of the first node to output a gate voltage;
a pass transistor connected between an input voltage and an output node through which the output voltage is output to operate in response to the gate voltage; and
a second current bias connected between the first power source voltage and the second node, wherein the second transistor is connected between the second node and the output node to operate in response to the voltage of the second node.

* * * * *